Figure 1:
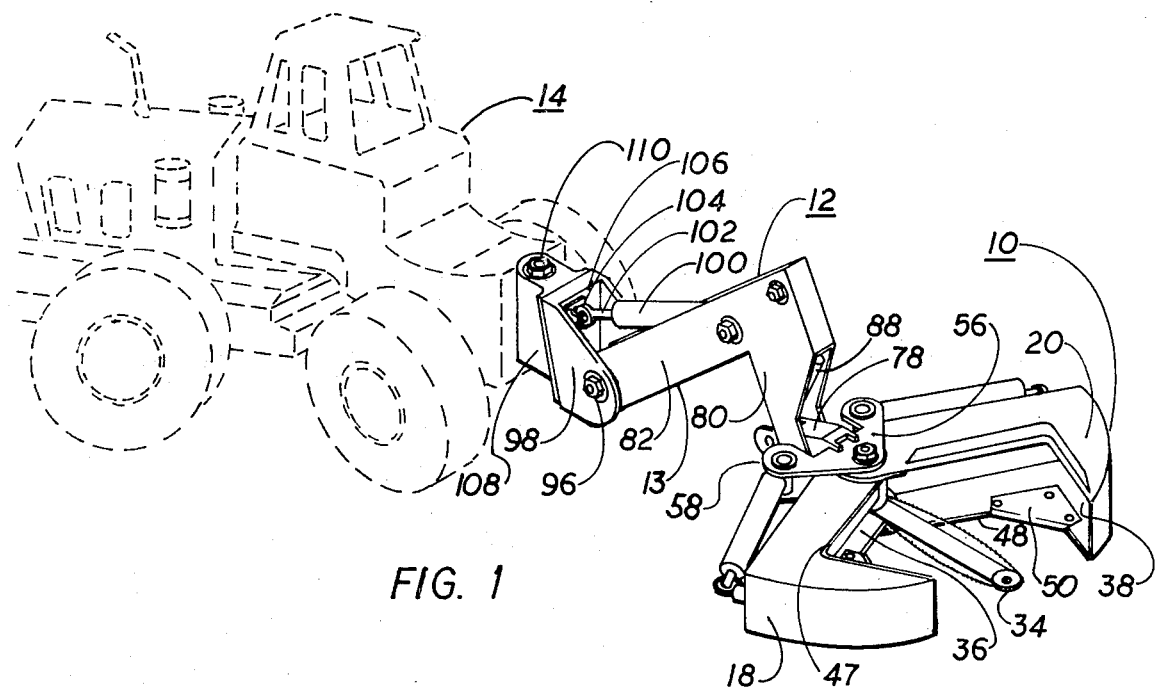

United States Patent [19]
Albright

[11] 3,796,242
[45] Mar. 12, 1974

[54] TREE CUTTING AND HANDLING APPARATUS

[76] Inventor: Alva Z. Albright, Rt. 1, Eudora, Ark. 71640

[22] Filed: Dec. 20, 1971

[21] Appl. No.: 209,639

[52] U.S. Cl. .......... 144/34 R, 83/928, 144/309 AC, 30/379
[51] Int. Cl. ........................................... A01g 23/08
[58] Field of Search .............. 144/3 D, 34 R, 34 E; 83/928, 996; 30/379

[56] References Cited
UNITED STATES PATENTS

| 3,565,138 | 2/1971 | Albright | 83/796 |
|---|---|---|---|
| 3,572,411 | 3/1971 | Coughran | 144/34 R |
| 3,542,100 | 11/1970 | Choat | 144/34 R |
| 3,610,301 | 10/1971 | Jordan | 144/34 E |
| 3,688,816 | 9/1972 | Runeson | 144/34 R |

Primary Examiner—Donald R. Schran
Attorney, Agent, or Firm—James B. Lake, Jr.

[57] ABSTRACT

A clamp comprising a pair of dogleg jaws pivoted together with opposed double edges defining a variably sized rectangular aperture for transversely engaging a tree at four points on its circumference with each of said double edges. A chain saw is pivoted with the dogleg jaws and between the double edges and adapted to swing between said jaws to cut a tree held therein. The jaws are pivoted to a dogleg boom that itself is pivoted to a carrier link, the respective pivots being horizontally parallel and allowing the jaws to pivot over 180° and the boom less than that. The carrier link is vertically pivoted to a power train. Opposed shearing plates are fixed in the respective angles of the dogleg jaws on one only of the opposed double edges for shearing small trees. Hydraulic cylinders and pistons are adapted to swing the jaws and chain saw about their common pivot, the free ends of the jaws nesting in closed position. Additional hydraulic cylinders and pistons are adapted to swing the boom and clamp about their respective pivots. An hydraulic motor drives the chain saw in endless rotation. A flow divider mounted in the hydraulic power lines to the motor and chain saw regulates the speed of the chain saw swing inversely with the size of the rectangular apperture defined by the dogleg jaws.

10 Claims, 5 Drawing Figures

INVENTOR.
Alva Z. Albright

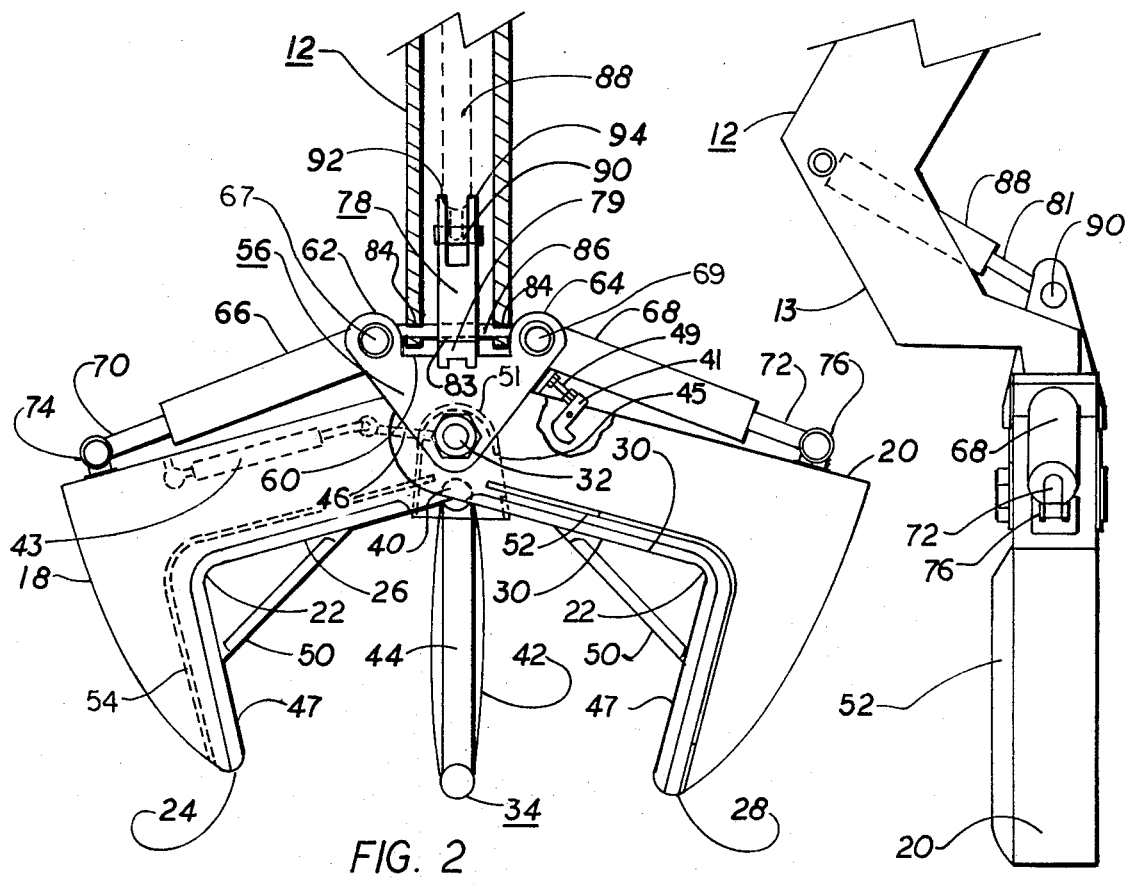
FIG. 2
FIG. 3
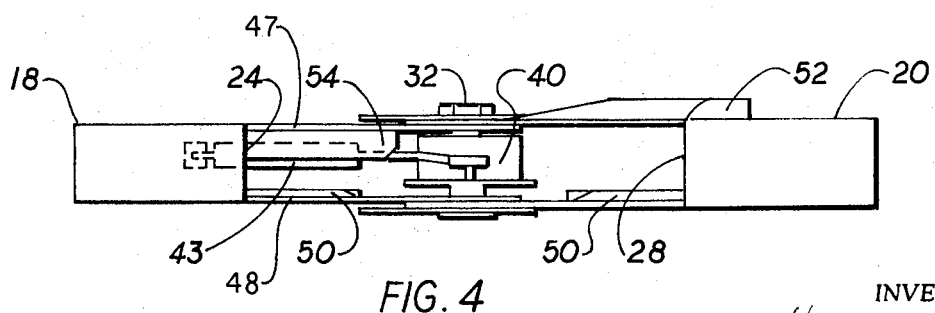
FIG. 4

TREE CUTTING AND HANDLING APPARATUS

The invention relates generally to tree cutting and handling apparatus, and more particularly to a tree supporting clamp in which a chain saw is operationally mounted.

The invention differs from the prior art in that the chain saw plays no part in the clamping action. Heretofore the saw formed one side of a clamp, the action of which terminated when the cut was completed. It then supported the weight of the cut tree. Other clamps used in the logging industry defined curved concave surfaces that engage all cylindrical objects transversely at two points only except in the one case when the curvature of the surfaces coincided exactly with that of the cylindrical object to provide full circumferential support. The saw bar of the invention never supports tree weight and does not touch the tree in any part other than the run of the saw chain in cutting the tree, the tree being held without movement as the chain saw passes through it.

It is an object of the invention to provide clamps with double edged dogleg jaws that cooperate to define variably sized rectangular apertures in which a tree of any diameter within the opening range of the jaws may be clamped and supported circumferentially at at least four points both above and below a cut.

Another object of the invention is to provide protection to the chain saw from exterior interference at all times.

Another object of the invention is to provide full clamping action when cutting a tree.

Still another object of the invention is to provide versatile apparatus that can cut, skid, and bunch by lifting and carrying and swinging, trees, and combine the functions of a plurality of machines.

Figure 5:
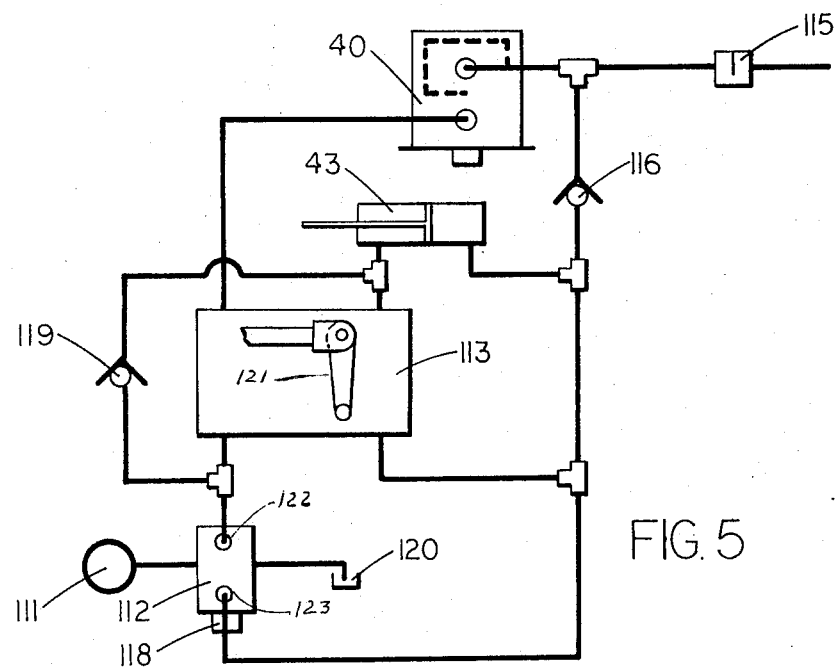

Other objects and a more complete understanding of the invention may be had by referring to the following description, claims and drawings, in which:

FIG. 1 is a three dimensional drawing of the invention installed on the end of a power train, FIG. 2 is a plan view of the invention with jaws open and chain saw therebetween, FIG. 3 is a side elevation of the matter shown in FIG. 2, FIG. 4 is an end view of the matter shown in FIG. 2, and FIG. 5 is a schematic diagram of a flow divider mounted in hydraulic power lines to chain saw motor and cylinder.

Referring to FIGS. 1–5, the invention comprises clamping and sawing apparatus 10, and articulated connecting apparatus 12 for mounting apparatus 10 on a power train 14 having an auxiliary hydraulic power system 16.

Referring to FIGS. 2–4, the clamping and sawing apparatus 10 comprises two opposing dogleg jaws 18 and 20, each defining a right angle 22 between their respective legs 24 and 26 of jaw 18, and 28 and 30 of jaw 20. The jaws are pivoted together at the ends of legs 26 and 30 by pivot pin 32 with respective right angles 22 concavely opposed and ends of legs 24 and 28 free. A chain saw 34 is pivoted by jaw pivot pin 32 in jaw 18 and is swingable between jaws 18 and 20.

Referring to FIG. 2, jaw 18 is slightly shorter and narrower than jaw 20 so, when jaws are closed, the free legs 24 and 28 nest together. The jaws are hollow and define opposing cavities 36 and 38, respectively, in the jaws 18 and 20. The chain saw 34 is housed in cavity 36 and swings about the same pivot pin 32 and center of rotation as do the jaws, thereby preventing any possible interference therewith. An hydraulic motor 40 is mounted with the chain saw 34 for driving a saw chain 42 around a center bar 44. The chain saw extends from the pivot pin 32 to just short of the closed back of leg 24 when the chain saw is housed in cavity 36.

An hydraulic cylinder 43 is pivotally mounted in cavity 36 also as shown in FIG. 2, with its piston pivotally fastened to a projection 45 of the center bar 44. The cylinder 43 is adapted to pivot chain saw 34 from cavity 36 to catch 41 in cavity 38. The spring catch 41 is slidably mounted in jaw 20 and engages in a notch 45 defined in a chain saw mounting plate 51 when said saw is swung to said catch 41. When the jaws are fully opened an adjustable bolt 49, mounted on a triangular collar 56, impinges on the spring catch 41 releasing it from said notch 45 and thereby releasing the chain saw for its return swing back to cavity 36.

Each of the dogleg hollow jaws 18 and 20 defines parallel double edges 47 and 48 along their respectively opposed open and concave sides. The edges 47 and 48 are beveled with said bevels disposed outwardly from chain saw 34 mounted between said parallel double edges. The bevels tend to exert force upwardly and downwardly, respectively, away from said chain saw thereby preventing compression from binding the saw in a cut. The edges 47 and 48 also penetrate the tree and, together with the grip of a pair of depth gauges 52 and 54 mounted adjacent and parallel to said bevels on edges 47, support a tree held therebetween. A pair of shearing plates 50 are mounted diagonally across doglet right angles 22 of jaw edges 48 for cutting trees of small diameter. Gauges 52 and 54 comprise vertical flanges mounted on on the jaws to prevent edges 47 and 48 from cutting into a tree too deeply or beyond said gauges. Gauge 52 is dogleg, and, mounted externally on jaw 20, extends parallel to edge 47 and normal thereto. Gauge 54 is mounted interiorly in jaw 18 and extends parallel to edge 47 also.

The triangular-shaped collar 56 comprises two parallel triangular plates 58 joined in spaced relationship by annular parts 62 and 64 at two outboard vertices and by pivot pin 32 at the remaining inboard vertex. Free side 60 of the collar 56 is indented between said annular parts which are adapted to pivotally mount hydraulic cylinders 66 and 68 respectively in the plane of their respectively associated jaws 18 and 20. The pistons 70 and 72 of said cylinders are pivoted in bearings 74 and 76 and adapted, when their respective cylinders are connected to and actuated by auxiliary hydraulic system 16, to swing open and closed said jaws 18 and 20 around pivot pin 32. A limk 78, having oppositely disposed ends, is rigidly keyed by an end 79 to the indented free side 60 of the collar 56 and defines a bearing 83.

Articulated connecting apparatus 12 comprises a dogleg boom 13 having oppositely disposed clamp connecting leg 80 and power train connecting leg 82. The free end of leg 80 is bifurcated to define opposite bearings 84 in the ends of said bifurcation. Pivot 86 engage in bearings 83 and 84 to pivotally attach boom 13 to link 78 and the jaws. Hydraulic cylinder 88 is pivotally mounted in clamp connecting leg 80, and its piston 81 is secured to the middle of a pivot pin 90, the ends of which engage in bearings 92, defined in the end 94 of link 78. When actuated from hydraulic power system 16, the cylinder 88 and piston 91 are adapted to swing the clamping and sawing apparatus 10 in excess of 180 degrees around pivot 86.

Power train connecting leg 82 of boom 13 has its free end pivoted by pivot pin 96 to an attaching plate 98. An hydraulic cylinder 100 is pivotally mounted in leg 82, and its piston 102 has its end pivoted in bearing 104 fixed on the adjacent face 106 of attaching plate 98. When said cylinder and piston are acutated from the hydraulic power system, boom 13 is pivoted about pins 96 to raise and lower the boom. The oppositely disposed side 108 of plate 98 is vertically pivoted to the front end of power train 14 by a combination pivoting apparatus 110. An hydraulic rotator (not shown), preferably the large size manufactured under the trade name Hyd-Ro-Ac by Houdaille Hydraulics of 545 E. Delavan Ave., Buffalo, New York 14211, may be included in said combination pivoting apparatus 110 for swinging said plate 98 about the pivot part of said combination.

Referring to FIG. 5, the auxiliary power system 16 comprises an hydraulic pump 111 that provides pressure fluid to a four way control valve 112. A control handle (not shown), mounted on said valve 112, controls direction of oil pressure liquid flow therefrom through respective ports 122 and 123. Port 122 of said valve is connected to flow divider 113, which in turn is connected to one side of saw cylinder 43 (the so-called rod side from whence the piston rod extends) and to chain saw motor 40. An adjustment handle 121 is mechanically linked to jaws 18 and 20 and adapted to divide the flow of pressure liquid in the flow divider between saw cylinder 43 and saw motor 40 with the flow to said cylinder inversely proportional to the opening of the jaws. Port 123 of valve 112 is connected to the return side of the saw motor through a ball check valve 116, the other side of the saw cylinder (the so-called can side from which a piston rod does not extend), and to a relief outlet in the flow divider. Also a conduit is provided to bypass flow divider 113 that extends from said rod end of the saw cylinder to port 122 of valve 112. Ball check valve 119 is mounted in said bypass conduit. A needle valve 115 connected with the return side of motor 40 bleeds off a small amount of liquid therein for lubricating the chain saw 34. In the sawing operation, movement of the control handle (not shown) mounted on valve 112 releases pressure fluid from pump 111 to flow to the flow divider as shown in FIG. 5. The fluid is restrained from flowing in the bypass conduit by ball check 119. In the flow divider the flow of pressure liquid is divided according to the setting of the adjustment handle 121 by a linkage (indicated only in FIG. 5) to jaws 18 and 20. The wider said jaws are open the greater the amount of pressure liquid which is oil goes to saw motor 40 to power the saw for cutting bigger logs, and the less goes to the saw cylinder 43 thus slowing the speed of saw swing through the log or tree. The oil from the flow divider goes respectively to the saw motor 40 and the rod end of saw cylinder 43 to activate them in accordance with the divided flow and is returned therefrom to port 123 of valve 112 and thence to tank 110 and pump 111. To swing the chain saw in the opposite direction, the flow of oil from valve 112 is reversed, leaving by port 123 to flow directly into saw cylinder 43 in the can end thereof. Ball check valve 116 prevents oil flow to the motor 40 thus eliminating reversing the motor. Chain saw 34 is swung in the opposite direction by the reverse flow through the saw cylinder and exits therefrom toward the flow divider. The setting of the flow divider is very restricted and would allow return of the oil too slowly to port 122 of valve 112, therefore the oil returns through the bypass conduit and through ball check valve 119. The saw motor, of course, does not run at all during the reverse flow.

To operate the invention, it is attached to an end of a power train 14 and the hydraulic cylinders 66, 68, 88, and 100 connected to the auxiliary hydraulic power system 16 of the power train. Hydraulic cylinder 43 and motor 40 are also connected to the hydraulic power system through the flow divider 113 for operation as explained above. The power train carries the invention, in the position shown in FIG. 1 except that chain saw 34 is in its initial starting position in jaw 18, up to a tree. Cylinders 66 and 68 are actuated to close the jaws 18 and 20 around the tree trunk. Cylinder 43 and motor 40 are actuated through the flow divider 113, the motor driving the saw chain in rotation for cutting, the cylinder swinging the chain saw transversely through the tree, and the flow divider regulating the speed of the swing by the opening of the jaws enclosing the tree. The clamp holds the tree in place as the cut is made between the double edges 47 and 48. Actuating cylinders 88 and 100 alternatively tips the cut tree in the longitudinal direction of the power train and combining this with pivoting the invention around said pivoting apparatus 110 introduces transverse direction of tipping the tree. Thus a tree can be pulled towards the power train by extending the piston of cylinder 88 when in position shown in FIG. 1. Then by raising the boom, the tree is lifted overhead into a roughly horizontal position with boom fully up. This is a good position for carrying and with an additional overhead rack (not shown) the invention becomes self-loading. The overhead position of the boom or in between is used for picking up the cut tree, swinging it to either side and then dropping it away from the power train by retracting cylinder 88 until the tree is falling and then placing control in a "float" or non-pressurized position that allows free movement of cylinder as it passes center of its pivot 90. Tiping of the tree breaks the grip of edge 48 on the stump in the same manner as when felling away from the power train. The chain saw is mounted in jaw 18 closer to edge 48 than to edge 47 so that when the tree falls the shoulder edges of the stump above edge 48 chips away leaving the severed tree engaged by edges 47, and gauges 52 and 54. As a severed tree falls cylinder 88 is deactivated to allow the jaws 18 and 20 to follow the change in plane of the tree fron vertical to horizontal while still maintaining its trip on the butt of tree. It can then be skided to a loading place. When the jaws are opened to release the cut tree, the chain saw which has been retained in jaw 20 by spring catch 41 is released therefrom as explained heretofore, and can be returned to its initial position for cutting in jaw 18 as hereinbefore explained.

Augmenting the control exercised by the flow divider 113 over the speed of chain saw swing, the cylinder 43 is attached to a lug 46 on the saw bar mounting plate 51 at an extreme angle when the saw bar is in its initial postion at he beginning of the cutting cycle. As the cylinder 43 is activated the angle becomes less and the effective radius of the piston rod and lug becomes greater and the swing of the saw bar slows down as the chain saw approaches its center position and the thickest part of the tree. As the lug and piston rod passes center position, the angle therebetween becomes more acute and the swing speeds up. The cutting is thus made more efficiently by slowing the swing while the chain saw passes through the thickest part of the tree, and speeds up at the edges.

What is claimed is:

1. Improved tree-cutting and handling apparatus for use with a power train having an auxiliary hydraulic power system, and comprising in combination: double jawed and double edged tree-clamping means for pivotally opening and closing to clamp around and to release a tree; chain saw means pivoted in one of said jaws of said double jawed and double edged tree-clamping means for pivoting to the other jaw to cut a tree clamped between said double edges thereof; and articulated connecting means for mounting said double jawed and double edged tree-clamping means on said power train and for fine positioning said clamping means relative to a tree.

2. Tree-cutting and handling apparatus as described in claim 1 wherein double jawed and double edged tree-clamping means comprise: a pair of dogleg jaws, each having opposite ends, a pair of said ends pivoted together for opening and closing the free pair of said ends, with concave sides opposing and free ends nesting when closed, and said double edges of each dogleg jaw being parallel for the length of its concave side, said sides together defining a variable rectangle for engaging a tree on four sides preparatory to cutting; and hydraulic cylinder means operatively connected with said auxiliary hydraulic power system, mounted between the convex side of each dogleg jaw and said articulated connecting means, for swinging said jaws open and closed.

3. Double jawed and double edged tree-clamping means as described in claim 2 wherein shearing blades are mounted across opposed cancave angles of one of said double edges of each dogleg jaw for cutting trees of small diameter.

4. Double jawed and double edged tree-clamping means as described in claim 2 wherein gauges for limiting penetration of said double edges into a tree are mounted externally on one dogleg jaw and internally on the other dogleg jaw, both gauges being equally spaced from a common edge of said double edges.

5. Double jawed and double edged tree-clamping means as described in claim 2 wherein said double edges are beveled to sharpness from respective outer surfaces of said dogleg jaws for exerting respective pressures normal to and away from both said edges.

6. Improved tree-cutting and handling apparatus as described in claim 1 wherein means for locking said saw chain means in said double jawed and double edged tree-clamping means at the completion of cutting a tree, and releasing said saw chain means at the release of said cut tree from the double jaws of said tree-clamping means at the release of said cut tree from the double jaws of said tree-clamping means, is mounted in part on each of said tree-clamping, chain saw, and articulated connecting means, and comprises: a a mounting plate rigid in said chain saw means and extending transversely to constitute the widest part of said chain saw means to engage said tree-clamping means at the beginning and end of said pivoting, said mounting plate defining an open notch on the periphery thereof; a spring loaded catch mounted on said tree-clamping means and biased to engage in said notch at the end of cutting and pivoting of said chain saw means; and a catch release bolt rigidly mounted on said articulated connecting means adjacent said spring loaded catch and adapted to engage and release said catch when the double jaws of said tree-clamping means are pivoted fully open to release said cut tree.

7. Tree cutting and handling apparatus as described in claim 1 wherein said chain saw means comprises in combination: a chain saw pivotally mounted by an end with said double jawed and double edged tree-clamping means; an hydraulic motor mounted with said chain saw for driving it in endless rotation; a connecting lug fixed to pivoted end of said chain saw and extending approximately normal to the longitudinal axis thereof; and an hydraulic cylinder means mounted in said tree-clamping means and pivotally connected with said connecting lug for swinging said chain saw between the double jaws of said tree-clamping means in a plane parallel to those of the double edges of said double jaws and at a rate of speed both initially and finally faster than in mid-swing where said tree is thicker.

8. Chain saw means as described in claim 7 wherein an hydraulic flow divider means is connected with said hydraulic cylinder and motor means for varying speed of swing of said chain saw proportional to the distance of said swing.

9. Chain saw means as described in claim 7 wherein said chain saw is mounted to swing and cut in a plane nearer to one of said double edges than the other of the double jawed and double edged tree-clamping means for edge of cut adjacent the nearest of said double edges to chip away thereby leaving said tree-claping means engaged to a part of the tree by the farther of said double edges from said cut.

10. Tree-cutting and handling apparatus as described in claim 1 wherein said articulated connecting means comprises: yoke means for rigidly engaging pivoted ends of the double jawed and double edged tree-clamping means; a dogleg boom pivoted by an end to said yoke means for provision of vertical movement therebetween of more than 180 degrees; hydraulic cylinder means mounted in said end of boom and pivotally connected with said yoke means for vertically pivoting said tree clamping means; a carrier link connected by horizontal pivot to the other end of said boom and connected by vertical pivot to said power train, said pivots in combination providing universal movement therebetween; an hydraulic cylinder means mounted in said other end of the boom and connected pivotally to said carrier link for actuating vertical movement around said horizontal pivot; and an hydraulic rotator mounted between said carrier link and said power train for actuating horizontal movement around said vertical pivot.

* * * * *